July 10, 1934.  N. M. BAKER  1,966,025
OPHTHALMIC MOUNTING
Filed Feb. 4, 1932
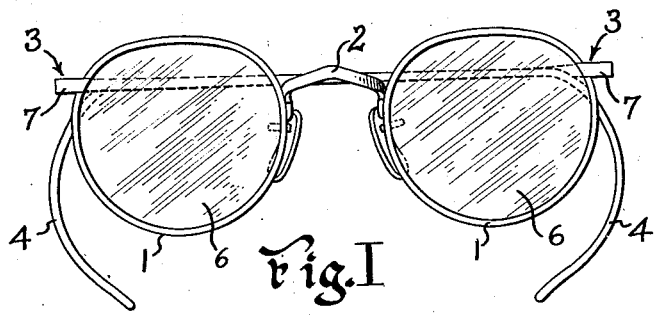
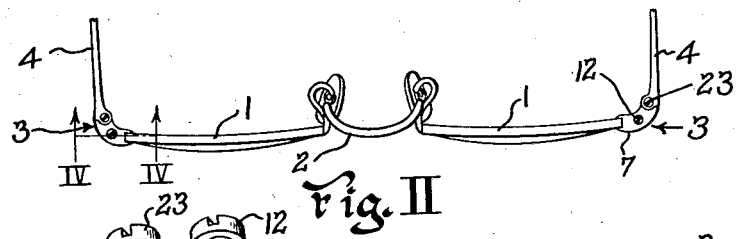
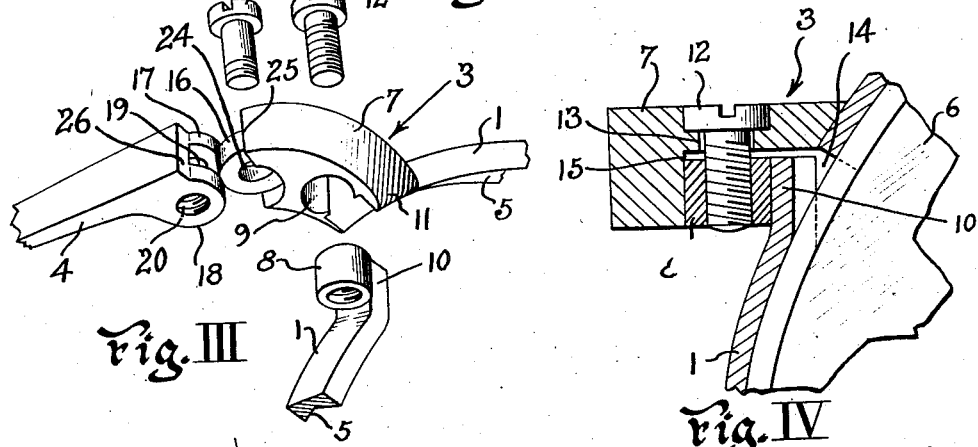
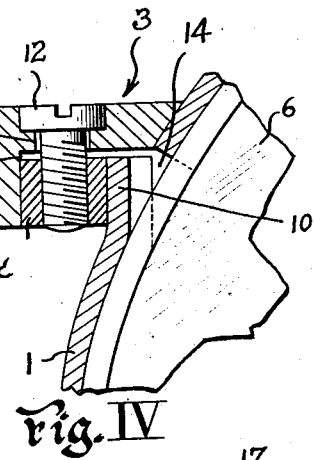
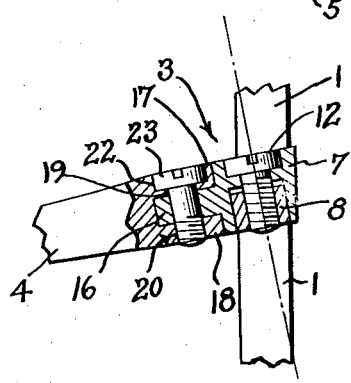
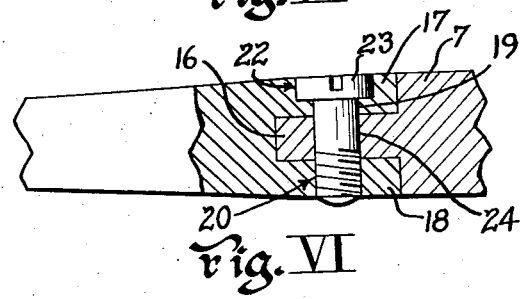
INVENTOR
Nelson M. Baker.
BY
Harry H. Styll
ATTORNEY Patented July 10, 1934

1,966,025

UNITED STATES PATENT OFFICE 1,966,025

OPHTHALMIC MOUNTING

Nelson M. Baker, Southbridge, Mass., assignor to American Optical Company, Southbridge, Mass., a voluntary association of Massachusetts Application February 4, 1932, Serial No. 590,894

7 Claims. (Cl. 88—53)

This invention relates to improvements in connecting or securing means and has particular reference to improved means for aligning and holding the parts together for securing a lens and is especially adapted for uniting the parts of an ophthalmic mounting such as the lens rims, temples, and endpieces, and for use in uniting parts embodying similar characteristics. It also relates to an improved process of mounting ophthalmic lenses in the lens holding means.

One of the principal objects of the invention is to provide an improved connection or securing device that is inconspicuous and which has its various parts constructed to be most durable and efficient in their requirements and of sufficient connection area to permit the means held by the connecting members to be interchanged independently of each other and without having to disunite the parts of said connection.

Another object is to provide improved means whereby the connecting means may be quickly and easily assembled and which possesses means by which slight variations in the peripheral sizes of lenses may be compensated for.

Another object is to provide improved means whereby the rim will maintain a gentle resilient grip on the peripheral edge of the lens and thereby avoid possible strain on the lens and breakage thereof during the use of the mounting, and an improved process for mounting lenses in the lens holding means.

Another object is to provide a rigid and durable temple connection having increased bearing surfaces throughout the interengaging parts thereof and which avoids the commonly known drop temple defect in devices of this nature.

Another object of the invention is to provide an ophthalmic mounting having its various parts constructed to be most durable and efficient in their requirements and so located on the mounting that clear and unobstructed vision is obtained throughout the useful field of vision.

Another object of the invention is to provide improved split lens rim connecting means wherein the parts of the connecting means will normally be in direct alignment with each other and permit ease in assembling and securing the parts together in said aligned relation without strain on the lens.

Another object of the invention is to provide an improved process of forming a split rim connection wherein no exposed spaces are present in which dirt, dust, etc., can collect, and which can be quickly and cheaply manufactured.

Other objects and advantages of the invention will become apparent from the following description taken in connection with the accompanying drawing and it will be apparent that many changes may be made in the details of construction, arrangement of parts, and steps of the process without departing from the spirit of the invention as expressed in the accompanying claims. I, therefore, do not wish to be limited to the exact details of construction, arrangement of parts, and steps of the process shown, as the preferred forms only have been shown by way of illustration. It will also be apparent that the device may have many uses and applications in other arts than the one specifically described here and all of which are embodied in this invention.

Referring to the drawing:

Fig. I is a front elevation of an ophthalmic mounting embodying the invention;

Fig. II is a top plan view of the mounting shown in Fig. I;

Fig. III is an enlarged fragmentary perspective view of the connection or securing means showing the parts disunited;

Fig. IV is an enlarged fragmentary sectional view taken on line IV—IV of Fig. II.

Fig. V is a side elevation of the connecting means shown in Fig. III showing the parts united and in cross section;

Fig. VI is a fragmentary enlarged view of the temple connection showing the parts in cross section.

The forming of a practical connection at the split in the rim of an ophthalmic mounting has, in the past, been very difficult, and has been the source of much discussion and wasted energy. Several different devices have been tried in an attempt to overcome many of its defects, namely, difficulty in assembling the connection when a lens is in position in the rim and of having the parts move out of alignment and cause a strain on the lens which, during the use of the mounting, causes the lens to crack and become impractical for use. Another difficulty which has caused much trouble in most connections in the past, is that the lenses had to be edged to the exact size of the rims, or in instances when they were edged too small, they would fit loosely in the rim and move off axis, or in instances when they were edged too large and the connecting screw was tightened sufficiently to close the split in the rim, the said connecting means would strain the lens and cause it to break.

Applicant overcomes the above defects by providing means which can be quickly and easily assembled and which imparts a gentle resilient grip on the lens during the use of the mounting regardless as to how tight the connecting means is on the lens and in which the parts cannot move out of alignment with each other and cause a strain on the lens and possible breakage thereof.

Referring to the drawing wherein similar characters of reference denote corresponding parts throughout, the mounting embodying the invention comprises a pair of split lens rims 1 connected by a bridge member 2 and provided adjacent the splits in the rims with connecting means 3 which also form an attachment for the temple 4 to the rims. The rims 1 are provided with a lens groove 5 to hold the lenses 6 in place therein and are provided on one end of the split ends with a housing 7, and on the opposite end with a tubular member 8, as shown in Figures III, IV, and V. The housing 7 is provided with a recess 9 adapted to receive the end 10 of the split rim 1 and attached tubular member 8 and is provided with lip portions 11 adapted to overlie the split in the rim 1 to conceal it from view. These lip portions provide means wherein the spread in the rim, caused by lenses that are not properly sized, may be hidden from view. This obviates the necessity of having to accurately size the lenses to fit the rims. Attention is directed to the fact that the recess 9 in the housing 7 is provided with a portion shaped to receive the tubular member 8 and with a portion adjacent said tube receiving portion shaped to receive the end of the split rim to which the tubular member 8 is attached. The tubular member 8 and adjacent end of the split rim to which the tube is attached, fit snugly within the recess 9 in the housing 7, and cannot twist out of alignment therewith. The tubular member 8 is held in position in the housing 7 by means of the screw member 12 which extends through an opening 13 in the housing and which is threadedly connected with the tubular member 8. The recess 9 formed in the housing is so constructed that a space 14 is provided between the end of the split rim to which the tubular member 8 is attached and the edge of the lens 6 internally of the housing 7. This space 14 provides means whereby the tubular member 8 and end of the rim 1 to which the tubular member 8 is attached will be normally out of engagement with the edge of the lens and free to move into alignment with the recess 9 in the housing. This allows the split connection to be quickly and easily joined together. This space 14 also allows the rim 1 to expand internally of the housing 7 and, through this expansion, causes the rim to impart a gentle resilient grip on the edge of the lens and thereby obviates strain and lessens the possible breakage of the lens during the use of the mounting. A space 15 is provided between the bottom of the recess 9 and the adjacent end of the split rim and attached tubular member 8 to provide means whereby the rim 1 may be tightened on the peripheral edge of a lens which has been edged slightly smaller than its intended size. Attention is directed to the fact that regardless as to what the space 15 may be after the rim 1 has been tightened on the periphery of the lens, no dust or dirt can collect in the space as the lip members 11 provide positive means for constantly concealing said space during the use of the mounting.

The housing member 7 is also provided with a wing portion 16 having an opening 24 therein which forms a hinge connection for the temple 4 as shown in Figures III, V and VI. The temple 4 is shaped to blend with the housing 7 and is provided with a pair of spaced wing members 17 and 18. The wing members 17 and 18 are formed with aligned openings 19 and 20, one of which is provided with a threaded bore and the other a shoulder 22. The temple 4 is attached to the wing member 16 by means of a screw 23 which extends through the aligned openings 19 and 20 in the wing members of the temple and the opening 24 in the wing member 16. Attention is directed to the fact that the housing 7 is cut away on each side of the wing 16 to the shape of the wing members 17 and 18 of the temple 4 to provide broad bearing surfaces throughout the interengaging parts thereof. This is to avoid the commonly known drop temple defect which is very annoying to the user of devices of this nature.

The cut away portion, along the edge 25, also forms stop means for engaging the flattened end 26 of the temple and thereby limits the outward pivotal movement of the temple.

Attention is directed to the fact that during the process of manufacture of the above connection 3, the tubular member 8 is first secured to the split end of the rim 1 and the said end is bent outwardly from the general peripheral edge of the rim as shown in Fig. IV, to align the tubular member 8 with the recess 9 in the housing. The tubular member 8 and bent end of the split rim 1 to which the tubular member 8 is attached are also offset rearwardly of the plane of the rim, as shown in Fig. V, to compensate for the angle at which the housing 7 is secured to the rim. This angle is for the purpose of inclining the temple downwardly from the connection 3 a slight amount when the mounting is positioned as worn on the face. The offsetting of the end of the split rim 1 and attached tubular member 8 as set forth above permits the connecting screw to be inserted in the housing 7 with its axis extending substantially normal to the upper surface of said housing. It also permits the head of the screw to lie flush with the upper surface of the housing when the parts are in assembled position.

Attention is called to the fact that the endpiece members 3 are positioned adjacent the top of the lens rims 1 to provide unobstructed vision at the sides of the mounting. They are reduced to minimum size and are designed to be exceptionally rigid, durable and inconspicuous in use.

From the foregoing description it will be seen that I have provided simple, inexpensive and efficacious means of carrying out all of the objects of the invention and the process of manufacture.

Having described my invention I claim:

1. In a device of the character described, a split lens rim, a tubular member adjacent one end of the split rim, a housing adjacent the other end of the split rim and having a recess therein shaped to receive and hold the tubular member and adjacent end of the split rim in alignment with the housing, the end of the rim having the tubular member thereon being deflected outwardly away from the general peripheral shape of the rim to align the axis of the tubular member with the axis of the recess in the housing and means to secure the tubular member and adjacent end of the rim internally of the housing, the ends of the split rim internally of the housing being offset from each other when the parts are united.

2. In a device of the character described, a split lens rim, a tubular member adjacent one end of the split rim, a housing adjacent the other end of the rim and having a recess therein shaped to receive and hold the tubular member and adjacent end of the split rim in alignment with the housing, said housing having perforated temple connecting means thereon, the axis of recess in the housing lying substantially parallel with the axis of the perforation in the temple connecting means, the end of the rim having the tubular member thereon being deflected outwardly away from the general peripheral shape of the rim to align the axis of the tubular member with the axis of the recess in the housing, and means to secure the tubular member and adjacent end of the rim internally of the housing, the ends of the split rim internally of the housing being offset from each other when the parts are united.

3. In a device of the character described, a split lens rim, a tubular member adjacent one end of the split rim, a housing adjacent the other end of the rim and having a recess therein shaped to receive and to hold the tubular member and adjacent end of the split rim in alignment with the housing, the end of the rim having the tubular member thereon being deflected outwardly away from the general peripheral shape of the rim and being deflected rearwardly of the plane of the rim to align the axis of the tubular member with the axis of the recess in the housing, and means to secure the tubular member and adjacent end of the rim internally of the housing, the ends of the split rim internally of the housing being offset from each other when the parts are united.

4. In a device of the character described, a split lens rim, a tubular member adjacent one end of the split rim, a housing adjacent the other end of the rim and having a recess therein shaped to receive and hold the tubular member and adjacent end of the split rim in alignment with the housing, said housing having perforated temple connecting means thereon, the axis of recess in the housing being inclined rearwardly relative to the plane of the lens rim when said rim is positioned as worn on the face and extending substantially parallel with the axis of the perforation in the temple connecting means, the end of the rim having the tubular member thereon, being deflected outwardly away from the general peripheral shape of the rim and being deflected rearwardly of the plane of the rim when positioned as worn on the face to align the axis of the tubular member with the axis of the recess in the housing and means to secure the tubular member and adjacent end of the rim internally of the housing, the ends of the split rim internally of the housing being offset from each other when the parts are united.

5. In a device of the character described, a divided lens rim, one end of the rim having an offset endpiece lug and the other end of the rim deflected from the line of the rim to lie substantially normal to the said endpiece lug and having an offset endpiece lug aligned with the first endpiece lug and means securing the two endpiece lugs together.

6. In a device of the character described, a divided lens rim, one end of the rim having an offset endpiece lug lying substantially in a horizontal plane when the mounting is held as worn on the face, and the other end of the rim deflected from the line of the rim to lie substantially normal to the plane of the endpiece lug and having an offset endpiece lug aligned with the first endpiece lug, and means securing the two endpiece lugs together.

7. In a device of the character described, a divided lens rim, one end of the rim having a perforated offset endpiece lug, and the other end of the rim deflected from the line of the rim to lie substantially normal to the said endpiece lug and having an offset perforated endpiece lug aligned with the first endpiece lug, and with the perforations in aligned relation with each other, and means in said aligned perforations for securing the endpiece lugs together.

NELSON M. BAKER.